United States Patent
Akwani et al.

(10) Patent No.: US 6,768,856 B2
(45) Date of Patent: Jul. 27, 2004

(54) HIGH GERMANIUM CONTENT WAVEGUIDE MATERIALS

(75) Inventors: Ikerionwu A. Akwani, Corning, NY (US); Robert A. Bellman, Painted Post, NY (US); Lynn B. Simpson, Painted Post, NY (US)

(73) Assignee: Corning Incorporated, Corning, NY (US)

(*) Notice: Subject to any disclaimer, the term of this patent is extended or adjusted under 35 U.S.C. 154(b) by 329 days.

(21) Appl. No.: 09/917,039

(22) Filed: Jul. 27, 2001

(65) Prior Publication Data

US 2002/0154878 A1 Oct. 24, 2002

Related U.S. Application Data

(60) Provisional application No. 60/267,909, filed on Feb. 9, 2001.

(51) Int. Cl.[7] .................................................. G02B 6/10
(52) U.S. Cl. ........................ 385/129; 385/142; 385/144; 501/55; 501/72; 65/413
(58) Field of Search ................................ 385/129, 142, 385/144; 501/53, 55, 72, 96.5; 65/386, 413, 414

(56) References Cited

U.S. PATENT DOCUMENTS

| | | | |
|---|---|---|---|
| 3,542,572 A | | 11/1970 | Dalton et al. |
| 3,884,550 A | * | 5/1975 | Maurer et al. .............. 385/142 |
| 4,201,442 A | | 5/1980 | McMahon et al. |
| 4,278,327 A | | 7/1981 | McMahon et al. |
| 4,464,223 A | | 8/1984 | Gorin |
| 4,490,737 A | * | 12/1984 | Pierce et al. ................ 257/634 |
| 4,495,298 A | * | 1/1985 | Yamagishi et al. ........... 501/55 |
| 4,720,172 A | | 1/1988 | Baker |
| 4,828,362 A | | 5/1989 | Skinner et al. |
| 4,902,650 A | * | 2/1990 | Caldwell et al. .............. 501/12 |
| 4,935,095 A | * | 6/1990 | Lehrer ........................ 438/782 |
| 5,841,933 A | * | 11/1998 | Hoaglin et al. ............. 385/142 |
| 6,379,873 B1 | * | 4/2002 | Bazylenko et al. ......... 430/321 |
| 6,408,125 B1 | * | 6/2002 | Akwani et al. ............. 385/142 |
| 6,563,973 B1 | | 5/2003 | Caracci et al. |

FOREIGN PATENT DOCUMENTS

| | | |
|---|---|---|
| EP | 0060783 | 9/1982 |
| EP | 0778247 A1 | 6/1997 |
| EP | 0881528 A2 | 12/1998 |
| JP | 62-127829 | 6/1987 |
| JP | 2000214505 | 8/2000 |
| JP | 2000231128 | 8/2000 |
| WO | WO97/23426 | 7/1997 |
| WO | WO99/04298 | 1/1999 |

OTHER PUBLICATIONS

U.S. patent application, Ser. No. 09/604,039 filed Jun. 27, 2000.

* cited by examiner

Primary Examiner—Akm Enayet Ullah
Assistant Examiner—Mike Stahl
(74) Attorney, Agent, or Firm—Walter M. Douglas; James V. Suggs

(57) ABSTRACT

Germanium-silicon oxide, germanium-silicon oxynitride and silica-germania-titania materials and oxynitride materials suitable for fabricating optical waveguides for liquid crystal based cross-connect optical switching devices have a refractive index of from about 1.48 to about 1.52 at 1550 nm, and a coefficient of thermal expansion at room temperature of from about $3 \times 10^{-6}$ °C.$^{-1}$ to about $4.4 \times 10^{-6}$ °C.$^{-1}$. The compositions are adjusted so that the refractive index of the germanium-silicon oxide, germanium-silicon oxynitride or silica-germania-titania material is closely matched to the refractive index of a typical liquid crystal material whereby improved optical performance of a liquid crystal based cross-connect optical switching device is achieved. The coefficient of thermal expansion of the germanium-silicon oxide, germanium-silicon oxynitride, or silica-germania-titania material is closely matched to the coefficient of thermal expansion of silicon, whereby strain induced birefringence caused by thermal stresses is reduced or avoided.

19 Claims, 13 Drawing Sheets

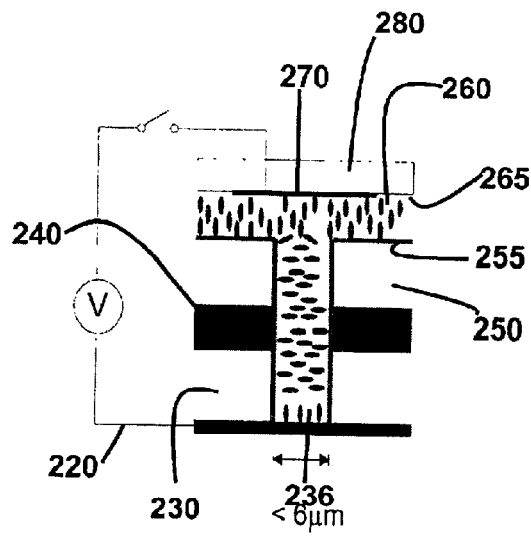
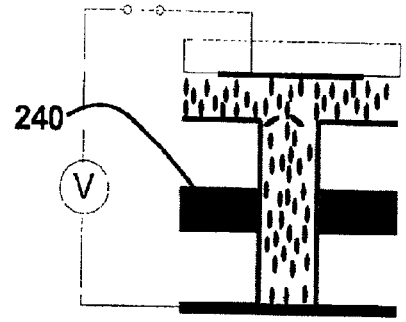
FIG. 7A  FIG. 7B
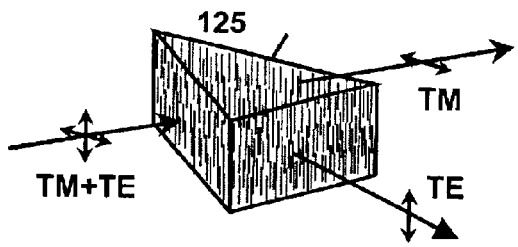
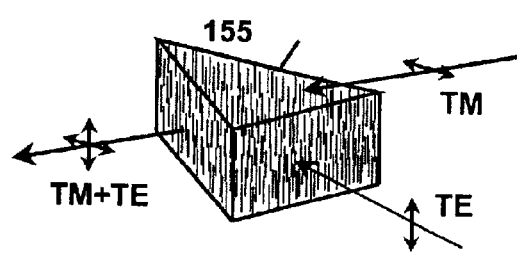
FIG. 8  FIG. 9
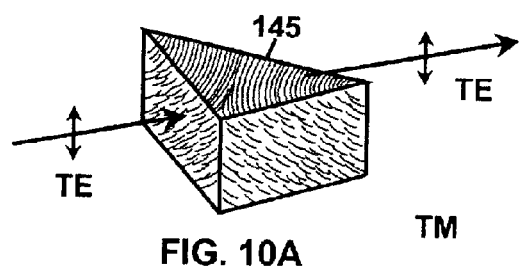
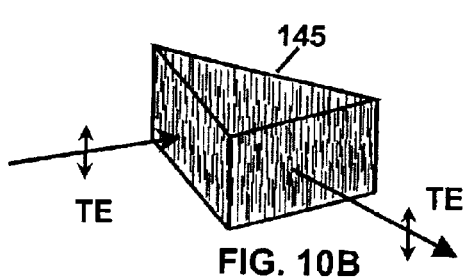
FIG. 10A  FIG. 10B
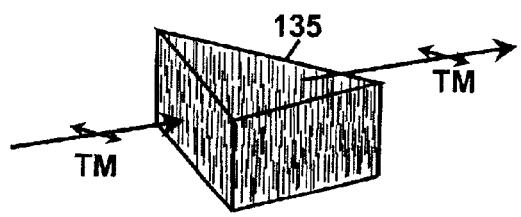
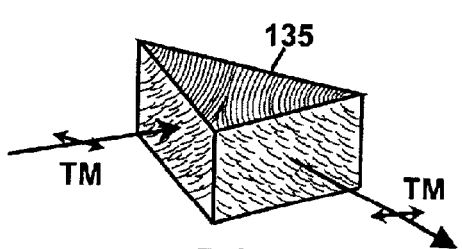
FIG. 11A  FIG. 11B

US 6,768,856 B2

HIGH GERMANIUM CONTENT WAVEGUIDE MATERIALS

CROSS-REFERENCE TO RELATED APPLICATION

This application claims priority under 35 U.S.C. § 119(e) on U.S. Provisional Application No. 60/267,909 entitled HIGH GERMANIUM CONTENT GERMANIUM-SILICON OXIDE AND OXYNITRIDE WAVEGUIDES, filed Feb. 9, 2001, by Robert A. Bellman et al., the entire disclosure of which is incorporated herein by reference.

BACKGROUND OF THE INVENTION

1. Field of the Invention

The present invention relates to germanium-silicon oxide, germanium-silicon oxynitride and silica-germania-titania materials containing large cation fractions of germanium, processes to deposit and densify these materials, and more particularly to such materials that are suitable for use in optical waveguides.

2. Technical Background

Planar optical devices are comprised of a waveguide core embedded in a waveguide cladding material, wherein the waveguide core has an index of refraction that is higher than the index of refraction of the cladding. The device is generally supported by a substrate. The waveguide core and cladding materials are typically either a silica-based glass or a polymer. Silica glass materials can be deposited by flame hydrolysis deposition (FHD), chemical vapor deposition (CVD), plasma enhanced chemical vapor deposition (PECVD), and physical vapor deposition, including sputtering, electron beam deposition, etc. Flame hydrolysis deposition and plasma enhanced chemical vapor deposition are preferred techniques for depositing silica-based glass waveguide materials (including cladding and core) because these techniques allow higher production rates and the resulting waveguides exhibit low propagation losses. Because planar optical devices are typically designed for use with silica optical telecommunications fiber, the refractive index (n) of the waveguide materials of the planar optical device is typically matched to that of the fiber (usually n is about 1.44 at 1550 nm). The dimensions of the waveguide core are typically about 8 µm in width, and the refractive index of the core typically exceeds the refractive index of the cladding by between about 0.2% and about 2%. This refractive index difference between a waveguide core and cladding is generally achieved by doping the core material with nitrogen or a higher refractive index oxide such as germania, phosphorous trioxide, titania, zirconia, etc. in order to raise its refractive index above that of the cladding. Alternatively, dopants such as boron and fluorine may be added to the cladding to depress its refractive index below that of the core.

The fabrication of a planar optical cross-connect signal switching device based on liquid crystal cells may be performed using prismatic liquid crystal cells and a planar waveguide circuit that matches the ordinary refractive index of the liquid crystal. For a typical liquid crystal (e.g., BL009, described herein) the ordinary refractive index at 1550 nanometers is on the order of 1.501. Thus, a preferred planar waveguide circuit for use in a liquid crystal-based cross-connect device has a refractive index at 1550 nm of about 1.501. Use of a typical planar light wave circuit with a refractive index matched to silica (n=1.44 at 1550 nm) leads to degradation of the optical performance of the cross-connect (i.e., increased optical cross-talk).

Because liquid crystal based optical cross-connect switching devices requires a ground electrode for applying an electrical field across the liquid crystal-filled trench in order to alter the orientation of the liquid crystal molecules to achieve switching, the use of a silicon substrate upon which the ground electrode may be deposited or a single crystal silicon substrate doped to be conductive is highly preferred when fabricating such devices. In order to prevent large thermal stresses which can cause strain-induced birefringence and excessive wafer curvature [which complicates photolithography and alignment of input and output optical fibers (pigtails)], it is important that the waveguide material, in addition to matching the ordinary refractive index of the liquid crystal ($n_{1550}$~1.501), also have a coefficient of thermal expansion that matches that of the silicon substrate.

Silicon oxynitride glass materials having a refractive index of about 1.5 at 1550 nm may be made by adjusting the nitrogen content of the glass. However, a SiON film with a refractive index of about 1.5 at 1550 nm would have a coefficient of thermal expansion of about $1\times10^{-6}$ $C.^{-1}$, as compared with a coefficient of thermal expansion of about $3.8\times10^{-6}$ $C.^{-1}$ for a silicon substrate. The low coefficient of thermal expansion (relative to silicon) of the SiON film having a refractive index of 1.5 at 1550 nm would consequently result in a large film strain and wafer curvature. In addition, adding nitrogen to the glass also increases the concentration of N—H bonds. The N—H bond has an overtone at 1510 nm which causes strong optical absorption in the 1550 nm communication band.

Thus, in order to fabricate planar optical cross-connect optical signal switching devices based on liquid crystal cells, there is a need for optical waveguide materials having a refractive index of about 1.5 at 1550 nm (i.e., matched to the ordinary refractive index of the liquid crystal) and a coefficient of thermal expansion of from about $3\times10^{-6}$ $C.^{-1}$ to about $4.4\times10^{-6}$ $C.^{-1}$ (i.e., matched to a silicon substrate).

SUMMARY OF THE INVENTION

This invention provides glass waveguide materials having a refractive index of about 1.5, and a coefficient of thermal expansion of from about $3\times10^{-6}$ $C.^{-1}$ to about $4.4\times10^{-6}$ $C.^{-1}$. Because these materials have a refractive index closely matched to the ordinary refractive index of a typical liquid crystal material, and a coefficient of thermal expansion closely matched to that of a silicon substrate, the materials of this invention are extremely useful for the fabrication of waveguides for use in liquid crystal based cross-connect optical switching devices.

In accordance with one preferred aspect of this invention, a germanium-silicon oxide or germanium-silicon oxynitride glass composition having a Ge/(Si+Ge) mole ratio of from about 0.25 to about 0.47 and an N/(N+O) mole ratio of about 0.1 or less is used in a liquid crystal based cross-connect optical switching device. The germanium-silicon oxide or oxynitride glass compositions of this invention preferably have a refractive index of from about 1.48 to about 1.52 at 1550 nm and a coefficient of thermal expansion at room temperature of from about $3\times10^{-6}$ $C.^{-1}$ to about $4.4\times10^{-6}$ $C.^{-1}$.

Additionally this invention provides a process to densify films of germanium-silicon oxide glass compositions having a Ge/(Si+Ge) ratio from about 0.25 to about 0.47, and a process to deposit fully dense films of germanium silicon oxynitride glass which have a composition having a Ge/(Si+Ge) ratio of from about 0.25 to about 0.47 and an N/(N+O) ratio of about 0.1 or less.

In accordance with another preferred aspect of this invention, a silica-germania-titania glass composition having a Ge/(Si+Ge+Ti) mole ratio of from about 0.08 to about 0.17 and a Ti/(Si+Ge+Ti) mole ratio of from zero to 0.08 is provided for use in a liquid crystal based cross-connect optical switching device. The silica-germania-titania glass compositions of the invention preferably have a refractive index of from about 1.48 to about 1.52 at 1550 nm, and a coefficient of thermal expansion at room temperature of from about $3 \times 10^{-6}$ $°C.^{-1}$ to about $4.4 \times 10^{-6}$ $°C.^{-1}$.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIGS. 7A and 7B are cross-sectional side views of LC prisms in two different alignment states;

FIG. 8 is a perspective view of an LC prism functioning as a polarization splitter;

FIG. 9 is a perspective view of an LC prism functioning as a polarization combiner;

FIGS. 10A and 10B are perspective views of an LC prism functioning as a TE switch and shown in its two different states;

FIGS. 11A and 11B are perspective views of an LC prism functioning as a TM switch and shown in its two different states;

DETAILED DESCRIPTION OF THE PREFERRED EMBODIMENTS

In one aspect, the invention provides compositions of germanium-silicon oxide (GeSiO) and oxynitride (GeSiON) suitable for the fabrication of liquid crystal based cross-connect optical switching devices based on total internal reflectance using prismatic liquid crystal-filled trenches. The GeSiON composition range of interest for use in liquid crystal based cross-connect optical switching devices may be estimated from the end members of the GeSiON system using rules of mixtures. As used herein, end members are the pure metal oxides and nitrides from which the composition may be derived. The refractive index and coefficient of thermal expansion for the end members of the system ($SiO_2$, $GeO_2$, $Si_3N_4$, and $Ge_3N_4$) are shown in Table 1.

TABLE 1

Refractive index and thermal expansion data for GeSiON end members.

| | $n_{632\,nm}$ | $n_{1550\,nm}$ | $a*10^7$ ($°C.^{-1}$) | Density (g/mL) |
|---|---|---|---|---|
| $SiO_2$ | 1.4578 | 1.444 | 7 | 2.63 |
| $GeO_2$ | 1.650 | 1.587 | 64 | 4.228 |
| $Si_3N_4$ | 1.95 | 1.91 | 30 | 3.1 |
| $Ge_3N_4$ | 2.23 | 2.14 | 48 | 5.25 |

Figure 1:
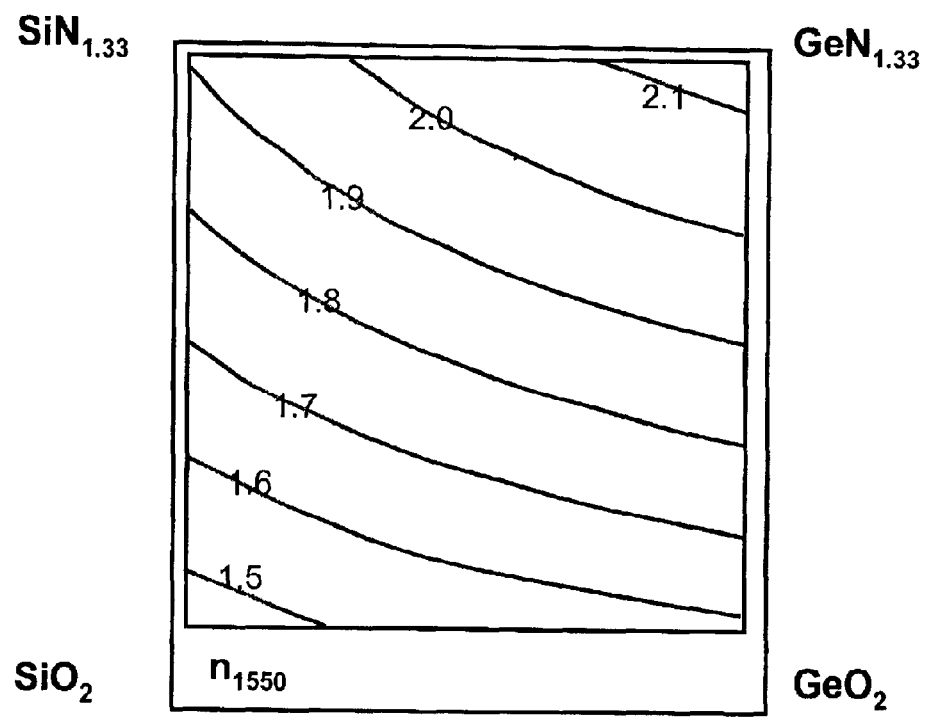
FIG. 1 is a graph of estimated refractive index for a germanium-silicon oxynitride system.
Figure 2:
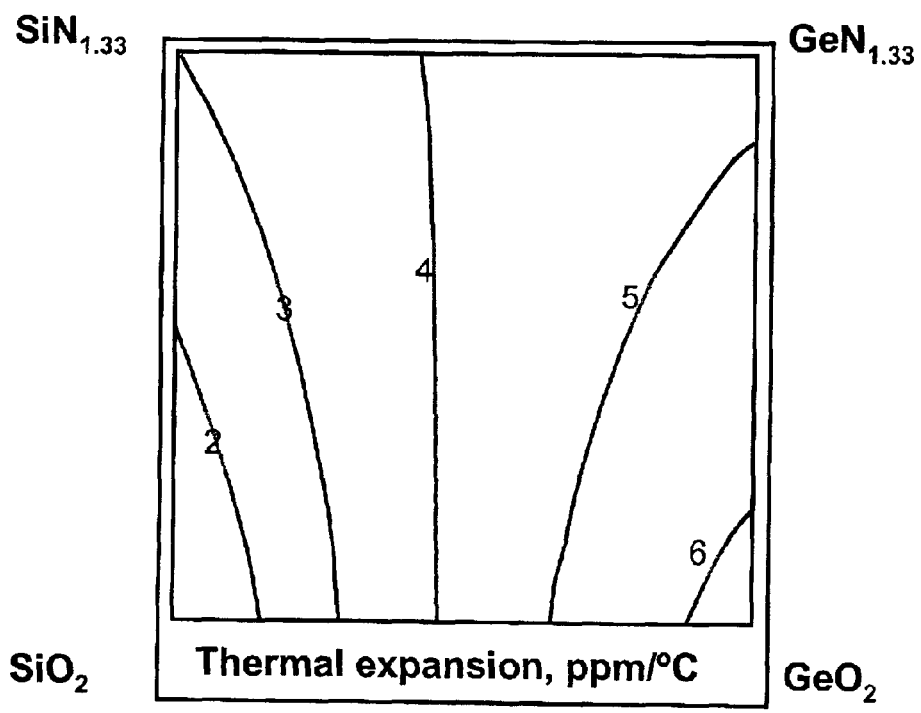
FIG. 2 is a graph of estimated coefficients of thermal expansion for a germanium-silicon oxynitride system.
Figure 3:
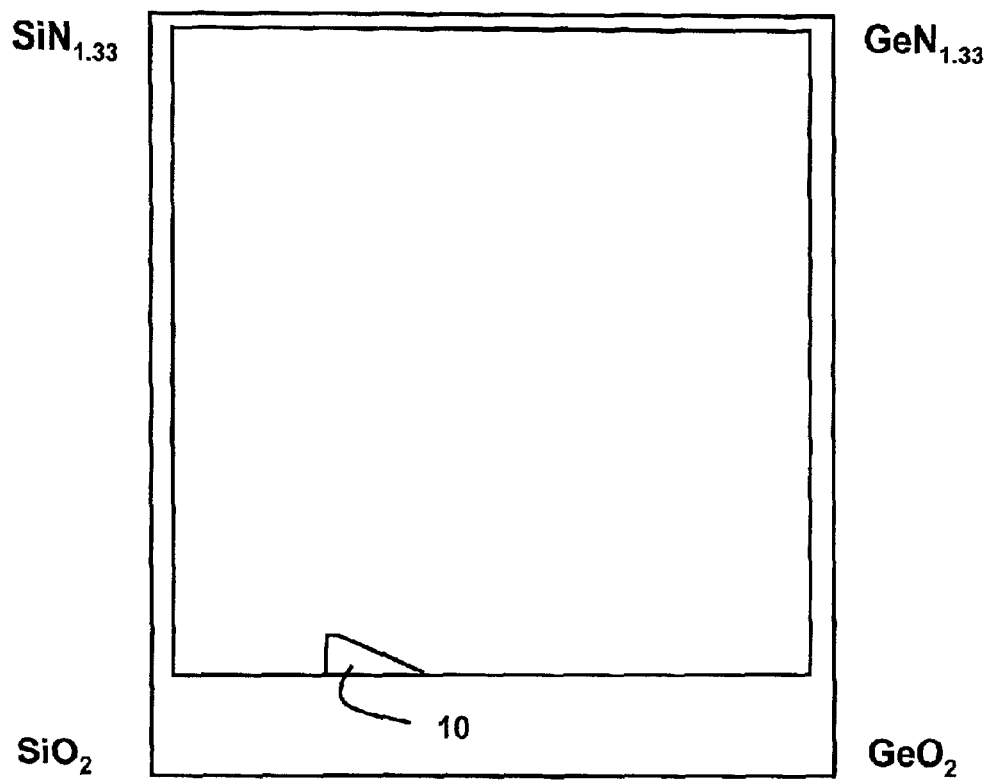
FIG. 3 is a graph showing the compositional range for a germanium-silicon oxynitride material having an index of refraction of from about 1.48 to about 1.52 at 1550 nm and a coefficient of thermal expansion of from about $3 \times 10^{-6}$ $°C.^{-1}$ to about $4.4 \times 10^{-6}$ $°C.^{-1}$.

FIG. 1 is a graph showing lines of constant refractive index for GeSiON systems estimated from the end member values. The refractive index of GeSiON glasses follows the rule of mixture by mole fraction. FIG. 2 shows lines of constant coefficient of thermal expansion for GeSiON systems estimated from the end member values. The coefficient of thermal expansion of these glasses follows the rule of mixture by volume fraction. From the estimated refractive indices and coefficients of thermal expansion shown in FIGS. 1 and 2, it was determined that a refractive index of about 1.5 at 1550 nm, and a coefficient of thermal expansion of from about $3 \times 10^{-6}$ $°C.^{-1}$ to about $4.4 \times 10^{-6}$ $°C.^{-1}$ can be achieved when the Ge/(Si+Ge) ratio is from about 0.25 to about 0.47, and the N/(N+O) is 0.1 or less. FIG. 3 shows the composition region 10 of interest, wherein an index of refraction of from about 1.48 to about 1.52 at 1550 nm, and a coefficient of thermal expansion of from about $3 \times 10^{-6}$ $°C.^{-1}$ to about $4.4 \times 10^{-6}$ $°C.^{-1}$ is achieved. The desired compositions may be represented in terms of parameters x and y by the idealized, hydrogen-free formula $Si_{1-x}Ge_xO_{2(1-y)}N_{1.33y}$, wherein x and y may range from 0 to 1. The region of primary interest is centered at a Ge/(Ge+Si) ratio of about 0.35 and an N/(N+O) ratio of about 0.05, with suitable compositions having a Ge/(Si+Ge) ratio of from about 0.25 to about 0.47 and an N/(N+O) ratio of from about 0 to about 0.1.

The germanium silicon oxide or oxynitride films which comprise the core and cladding of the optical waveguide are preferably deposited by chemical vapor deposition (CVD). Low pressure CVD (LPCVD), atmospheric pressure CVD (APCVD) and plasma enhanced CVD (PECVD) can be used. However, PECVD is the preferred method. Examples of PECVD deposition are described below.

GeSiON EXAMPLES

The germanium silicon oxide and oxynitride films of this invention were deposited by PECVD using a STS Multiflex PECVD system. This system comprises a parallel plate reactor where the precursor gases enter through an array of holes in the top electrode (showerhead), and the sample rests on the bottom electrode. The system is pumped with a blower, and a plasma may be formed by either a low frequency (375 kHz) or high frequency (13.56 MHz) RF generator and matching networks. Alternatively, a plasma may also be formed using both generators either by pulsing, or operated simultaneously as described in U.S. Pat. No. 4,464,223.

Germanium silicon oxide films are formed using silane ($SiH_4$), deuterated silane ($SiD_4$), germane ($GeH_4$), deuterated germane($GeD_4$), and a suitable carrier gas. Germanium silicon oxynitride films are formed using silane ($SiH_4$), deuterated silane ($SiD_4$), germane ($GeH_4$), nitrous oxide ($N_2O$), nitrogen ($N_2$), optionally ammonia ($NH_3$) or deuterated ammonia ($ND_3$), and a suitable carrier gas. Alternatively, germanium silicon oxide films may be formed from tetraethoxysilane, tetramethoxygermane, oxygen, and nitrogen or suitable carrier, and germanium silicon oxynitride films may be formed from tetraethoxysilane, tetramethoxygermane, oxygen, ammonia or deuterated ammonia, and nitrogen or suitable carrier are used. A more comprehensive list of possible silicon precursors includes, but is not limited to, silane, disilane, dichlorosilane, silicon tetrachloride, tetraethoxysilane, tetramethoxysilane, diacetoxydi-sec-butoxysilane, diethoxysilane, tetrakisdiethylaminosilane, tetrakisdimethylaminosilane, octamethylcyclotetrasiloxane, tetramethylcyclotetrasiloxane and bis-t-butylaminosilane. Possible germanium precursors include, but are not limited to, germane, digermane, germanium tetrachloride, tetramethoxygermane, tetraethoxygermane, tetramethylgermane, tetraethylgermane, diethyldichlorogermane, and octamethylcyclotetragermoxane. Possible oxidizers include, but are not limited to, nitrous oxide, nitric oxide, oxygen, and ozone. Possible nitrogen sources include but are not limited to ammonia, deuterated ammonia, trimethylamine, and hydrazine. Possible carrier gases include but are not limited to nitrogen, argon, helium, xenon, krypton, neon, and hydrogen.

Figure 12:
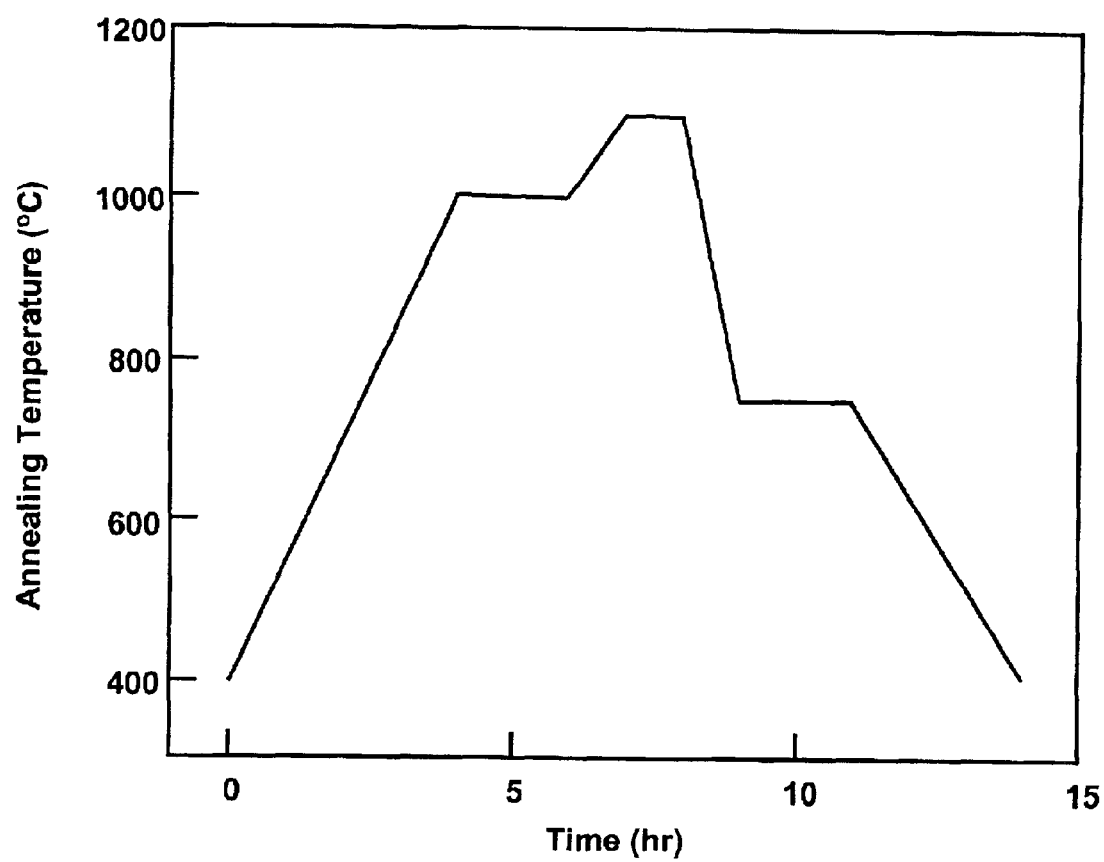
FIG. 12 is a graph of a typical annealing temperature cycle which will fully densify a germanium-silicon oxide film that contains a large cation fraction of germanium.

In the first example, a germanium silicon oxide underclad comprised of two 8 µm thick layers, each deposited under the conditions listed as "EX. A ½ clad" in Table 2, was formed. On top of this, a 6.25 µm germanium silicon oxide core with a refractive index contrast of Δn=0.34% was deposited under the conditions listed as "EX. A core" in Table 2. Because these layers were only 98% dense as deposited, each layer was annealed to densify the film before subsequent layers were deposited. A typical temperature cycle is shown in FIG. 12. Annealing was performed in an oxidizing atmosphere, with or without steam to suppress the reduction of germanium oxide. A cooling rate greater than 200° C./hr from the maximum temperature of 1,100° C. to below the strain point of the glass was required to prevent phase separation into germanium rich and germanium poor phases. The core was patterned and etched using conventional photolithography and reactive ion etching techniques. The patterned core was overcladded with 16–20 µm thick of glass having a refractive index matched to the underclad. The overclad can be deposited using either PECVD or FHD. Straight waveguides created by this process have waveguiding losses as low as 0.09 dB/cm (loss of 0.59 dB measured for a guide 7.2 cm in length, and a 0.2 dB fiber-to-guide coupling loss was assumed.)

In the second example, a 16 µm thick germanium silicon oxynitride underclad layer was deposited under the conditions listed as "EX. B clad" in Table 2. On top of this, a 6.25 µm thick germanium silicon oxynitride core with a refractive index contrast of Δn=0.88% was deposited under the conditions listed as "EX. B core" in Table 2. These layers were 100% dense as deposited, and may be deposited in one continuous process, or in discrete process steps.

Figure 13:
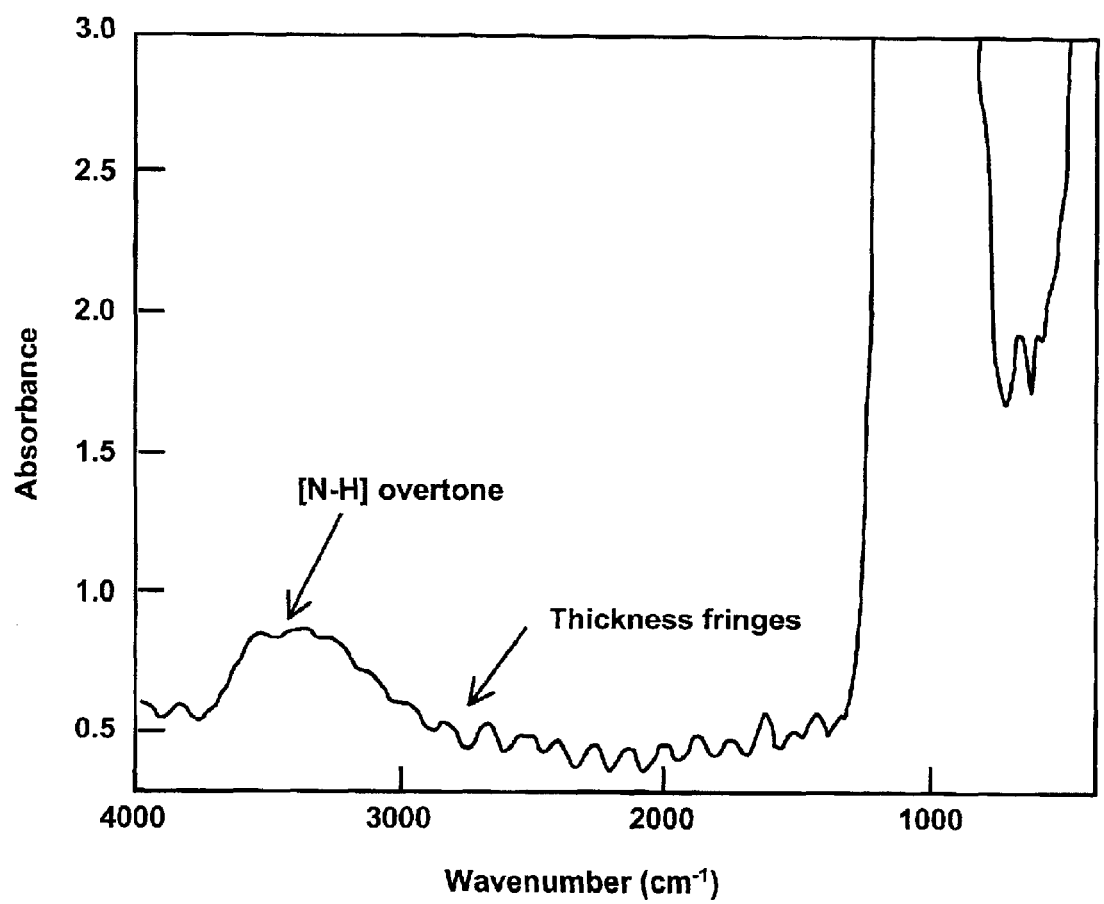
FIG. 13 is an FTIR spectrum of a germanium-silicon oxynitride film.

The core was patterned and etched using conventional photolithography and reactive ion etching techniques. The patterned core is overcladded with a 16–20 µm thick layer of glass having a refractive index matched to the underclad. The overclad can be deposited using either PECVD or FHD. Slab waveguide losses as measured by a prism coupling system were 3.4 dB/cm as deposited. Annealing at 400–600° C. in nitrogen or other inert gas reduced slab waveguide losses to 2.5 dB/cm. The FTIR spectrum of a germanium silicon oxynitride film is shown in FIG. 13. This spectrum shows that the origin of the optical loss is the overtone of the N—H absorption band.

Figure 14:
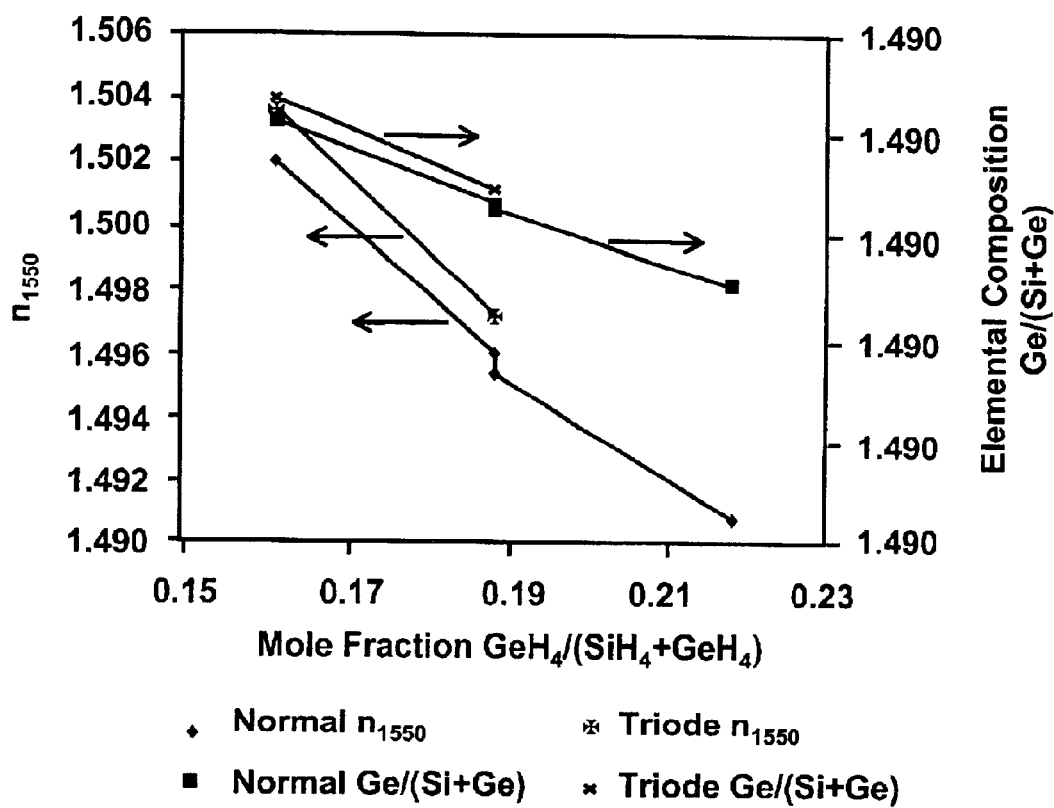
FIG. 14 is a graph comparing refractive index at 1550 nm (left) and elemental composition (right) of the germanium-silicon oxide films deposited by the process of example A in Table 2, and the germanium-silicon oxynitride films deposited by the process of example C in Table 2.
Figure 15:
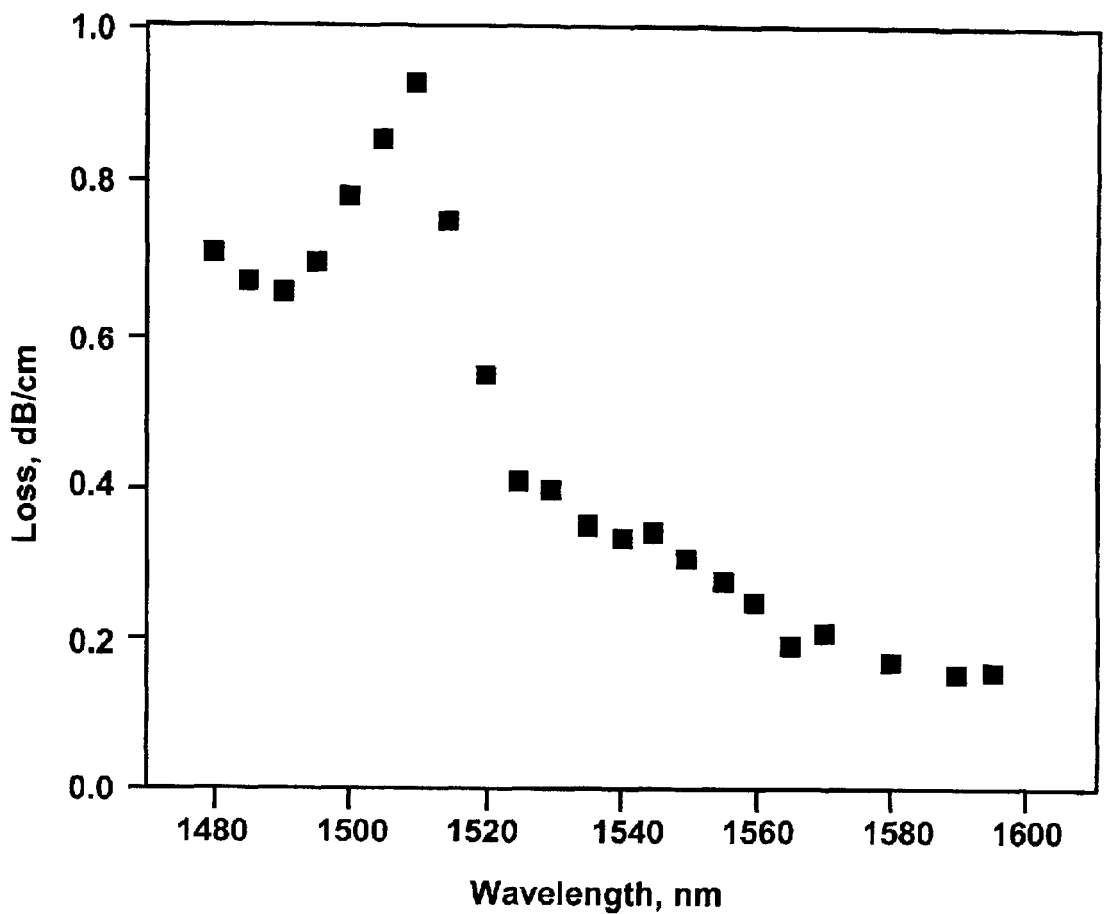
FIG. 15 is a graph showing slab waveguide loss as a function of wavelength for germanium-silicon oxynitride planar waveguides deposited by conditions listed in example C in Table 2, with slab waveguide loss being measured with a dual prism coupler.
Figure 16:
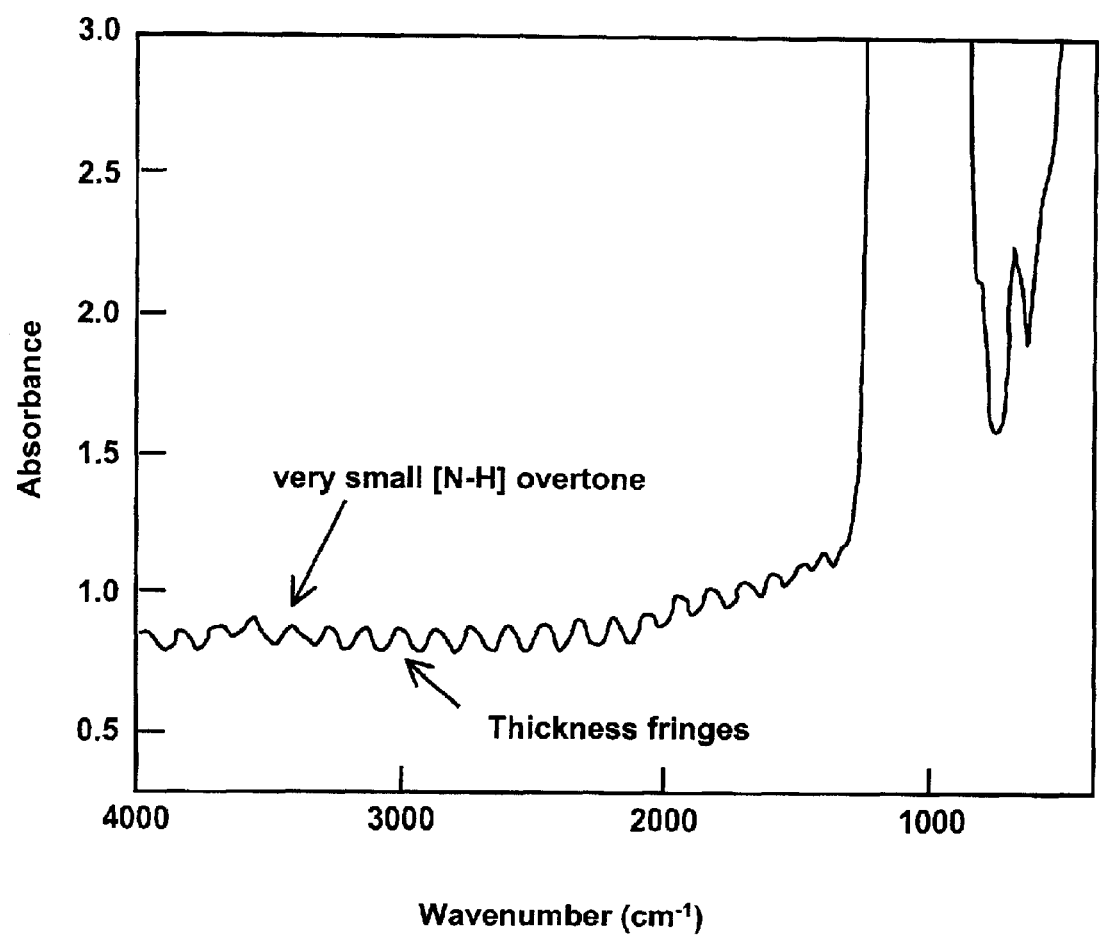
FIG. 16 is an FTIR spectrograph of an as-deposited germanium-silicon oxynitride under-clad/core formed under the conditions listed in example C in Table 2.
Figure 20:
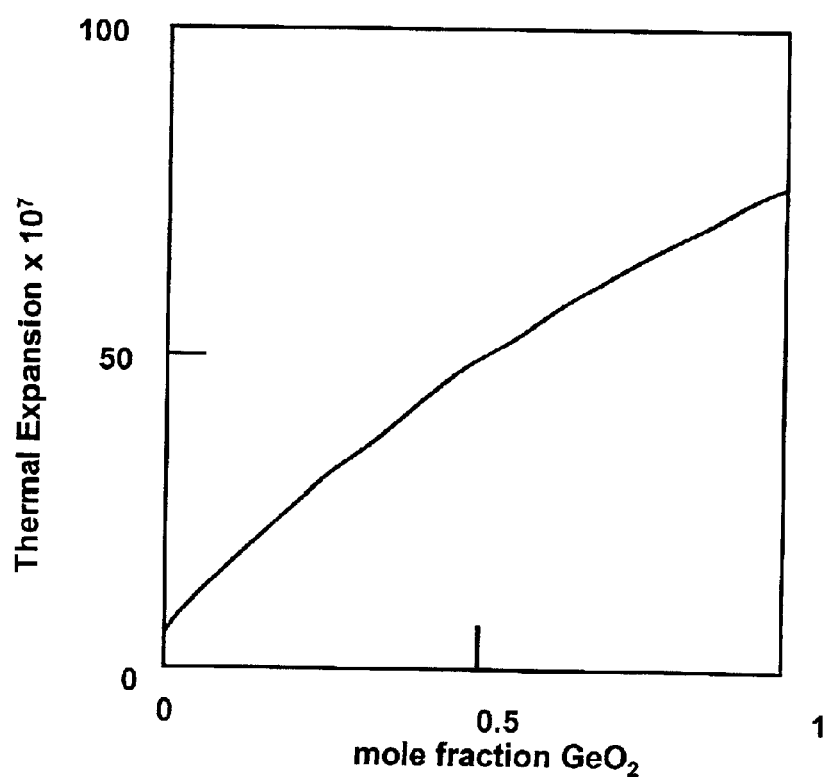
FIG. 20 is a plot of coefficient of thermal expansion verses mole fraction $GeO_2$ of silica-germania glasses calculated using rule of mixtures.

In a third example, a 16 mm thick germanium silicon oxynitride underclad layer was deposited under the conditions listed as "EX. C clad" in Table 2. On top of this, a 6.25 µm thick core with a refractive index contrast of Δn=0.39% was deposited under the conditions listed as "EX. C core" in Table 2. A nitrogen source that is free of hydrogen-nitrogen bonds is preferred. Examples of suitable nitrogen sources include nitrogen gas and nitrous oxide. In this process, high frequency (13.56 MHz) RF power was applied to the top electrode to increase gas disassociation, and low frequency (typically 380 kHz) RF was applied to the bottom electrode on which the sample rested to provide a negative substrate bias. This process, known as triode mode, provided increased ion bombardment of the sample. These layers were 100% dense as deposited, and may be deposited in one continuous process, or in discrete process steps. FIG. 14 shows the film refractive index and elemental composition as measured by electron microprobe as a function of the gas phase germane mole fraction of hydrides. For an equal germane mole fraction, films deposited with the process described by example C are higher in refractive index than those deposited from the process of example A. The origin of this increase in refractive index is not a higher germanium content, because the microprobe results show that the germane cation mole fraction did not change. The origin of the increase in refractive index can be seen in FIG. 15, which shows the slab waveguide optical loss as a function of input wavelength for the as-deposited underclad/core. Slab waveguide loss at 1550 nm is only 0.3 dB/cm, however a strong loss peak of 1 dB/cm is observed at 1510 nm. FIG. 16 shows the FTIR spectra of this sample. The FTIR spectrum shows the origin of the 1510 nm absorption peak is an overtone of the N—H bond seen at 3450 cm$^{-1}$ in the FTIR. Thus the FTIR and slab waveguide losses indicate that under the conditions of example C, nitrogen is incorporated into the film. Furthermore, the width of the NH bond is narrower than films deposited with ammonia (example B), indicating less variation in the N—H bond angles.

thermal expansion of bulk glasses follows the rule of mixture by volume fraction (FIG. 20). The refractive index of silica-germania compositions was estimated from a linear fit of the rule of mixture curves, and thermal expansion was estimated from a quadratic fit.

For silica-titania glasses, the linear coefficients for change of refractive index and thermal expansion with change of

TABLE 2

| Recipe ID | EX. A ½ clad | EX. A Core | EX. B Clad | EX. B core | EX. C clad | EX. C core |
|---|---|---|---|---|---|---|
| 13.56 MHz RF (W) on top | | | | | 70 | 70 |
| 380 kHz RF (W) on top | 400 | 400 | 400 | 400 | | |
| 380 kHz RF (W) on bottom | | | | | 200 | 200 |
| Pressure (mtorr) | 350 | 350 | 350 | 350 | 300 | 300 |
| Substrate Temperature (° C.) | 350 | 350 | 350 | 350 | 350 | 350 |
| Showerhead Temperature (° C.) | 250 | 250 | 250 | 250 | 250 | 250 |
| 5% SiH$_4$/Ar (sccm) | 165 | 130 | 300 | 248 | 165 | 130 |
| 2% GeH$_4$/Ar (sccm) | 250 | 250 | 250 | 380 | 250 | 250 |
| N$_2$O (sccm) | 1500 | 1500 | 1250 | 1866 | 1500 | 1500 |
| ND$_3$ (sccm) | 0 | 0 | 50 | 40 | 0 | 0 |
| Deposition Time (min) | 60 | 52 | 110 | 35 | 120 | 52 |

TABLE 3

| Recipe ID | EX. A | EX. B | EX. C |
|---|---|---|---|
| Clad Index at 1550 nm | 1.4959 | 1.4924 | 1.5001 |
| Clad thickness (μm) | 16.0 | 22.36 | 15.96 |
| Core Index at 1550 nm | 1.5021 | 1.5056 | 1.5059 |
| Core Thickness (μm) | 6.25 | 7.84 | 6.13 |
| Δn (%) | 0.34 | 0.88 | 0.39 |
| Wafer Thickness (μm) | 1000 | 525 | 525 |
| Stress (MPa) | −27.3 | −119.0 | 38.2 |

Figure 17:
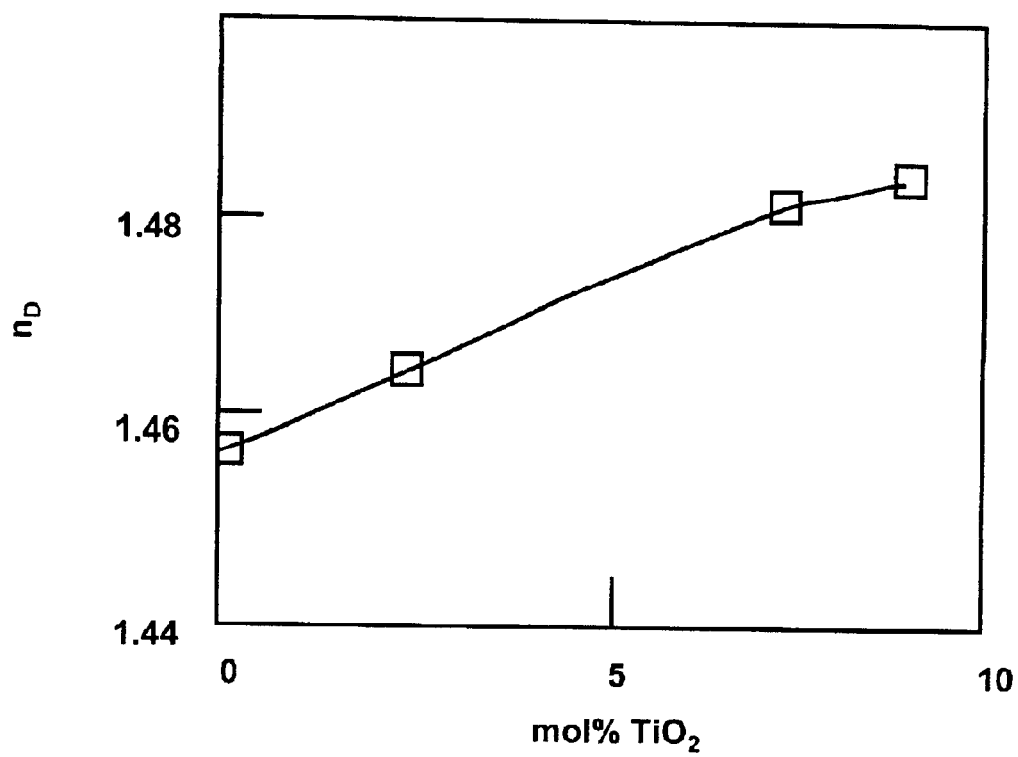
FIG. 17 is a plot of refractive index at the sodium D-line as a function of mole percent $TiO_2$ for silica-titania glasses.
Figure 18:
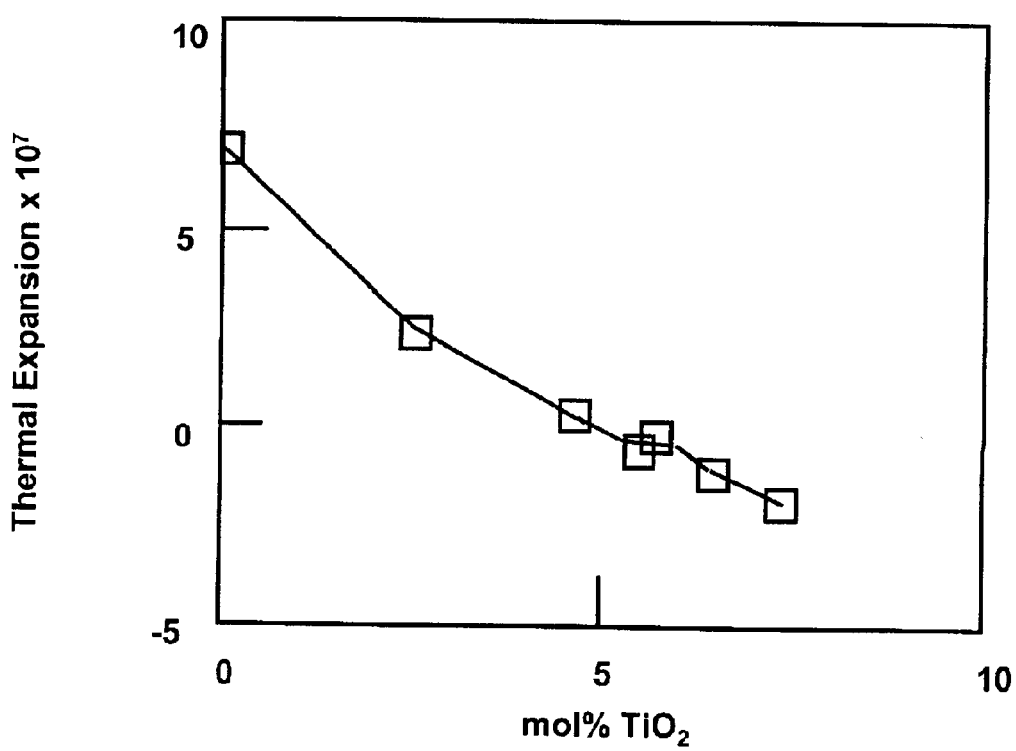
FIG. 18 is a plot of the coefficient of thermal expansion verses mole percent $TiO_2$ for silica-titania glasses.
Figure 19:
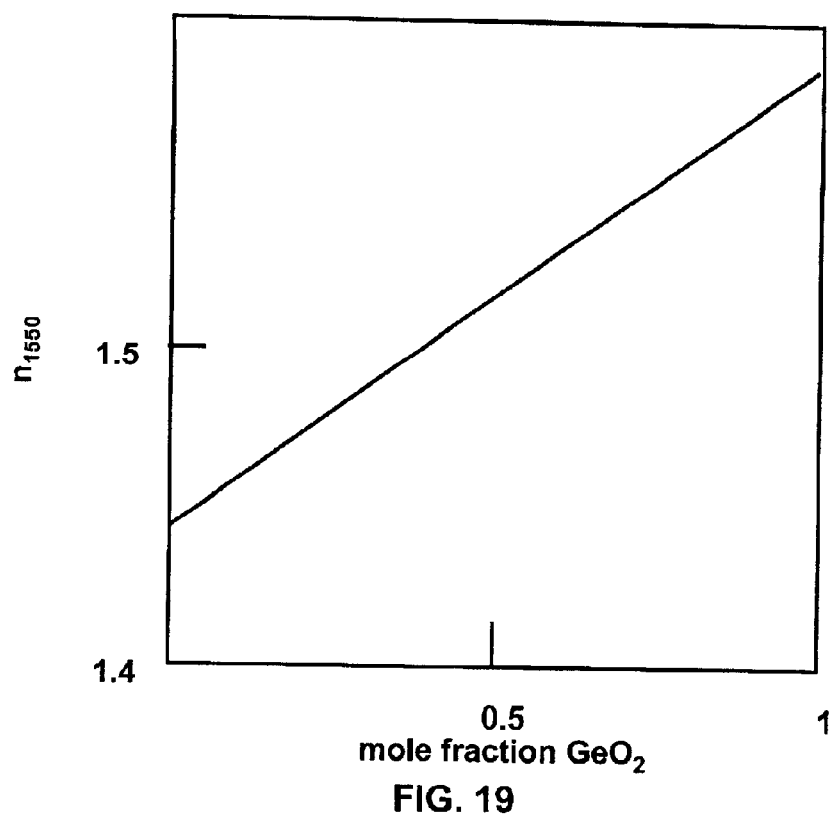
FIG. 19 is a plot of the refractive index at 1550 nm verses mole fraction $GeO_2$ for silica-germania glasses calculated using rule of mixtures.

In accordance with another aspect of this invention, compositions of silica-germania-titania (SiO$_2$—GeO$_2$—TiO$_2$) that are appropriate for fabrication of a low index optical cross-connect optical switching device based on internal reflectance using prismatic liquid crystal cells and the process for depositing optical quality films of these materials are disclosed. The silica-germania-titania composition range of interest for use in liquid crystal based cross-connect optical switching devices may be estimated from the binary systems silica-titania and silica-germania assuming no interaction terms. For the silica titania binary system, a linear fit of refractive index and coefficient of thermal expansion data available the "Handbook of Glass Properties," (Bansal, Narottam P. and Doremus, R. H., Academic Press (1986), Orlando, pp. 138 and 552) was performed. (FIGS. 17 and 18). From available literature data and data from PECVD deposited samples, it has been shown that the refractive index of silica-germania glasses follows the rule of mixture by mole fraction (FIG. 19), and that the composition in mole percent titania is shown in Table 4. It was assumed that the linear coefficient for refractive index at 1550 nm is equal to that at sodium D-line.

TABLE 4

| $\Delta n/\Delta$(mol % TiO$_2$), %$^{-1}$ | $\Delta(a \cdot 10^7)/\Delta$(mol % TiO$_2$), ° C.$^{-1}$ %$^{-1}$ |
|---|---|
| 0.311 | −1.195 |

Linear coefficients for change of refractive index at 1550 nm and coefficients for quadratic fit of thermal expansion with change of composition in mole percent germania for silica-germania glasses are shown in Table 5.

TABLE 5

| $\Delta n/\Delta$(mol % GeO$_2$), %$^{-1}$ | (a$_0 \cdot 10^7$) | $\Delta(a \cdot 10^7)/\Delta$(mol % GeO$_2$)° C.$^{-1}$%$^{-1}$ | $\Delta^2((a \cdot 10^7)/\Delta^2$(mol % GeO$_2$)° C.$^{-2}$%$^{-2}$ |
|---|---|---|---|
| 0.143 | 7.731 | 99.723 | −32.035 |

Figure 21:
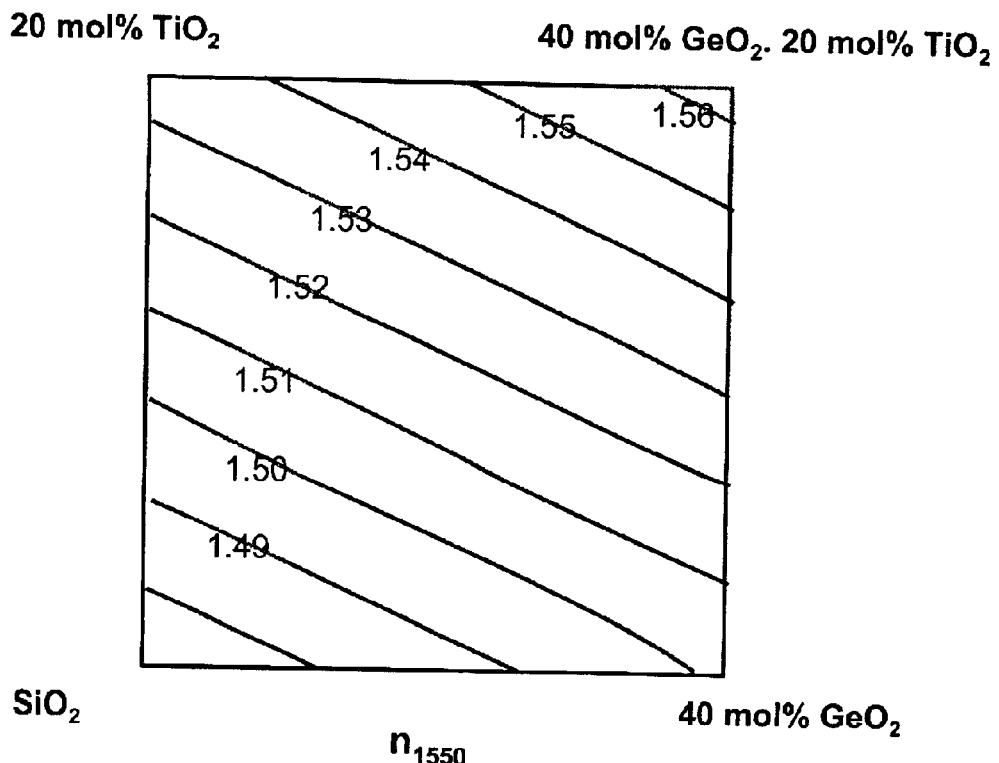
FIG. 21 is a graph of estimated refractive index at 1550 nm for a silica-germania-titania system.
Figure 22:
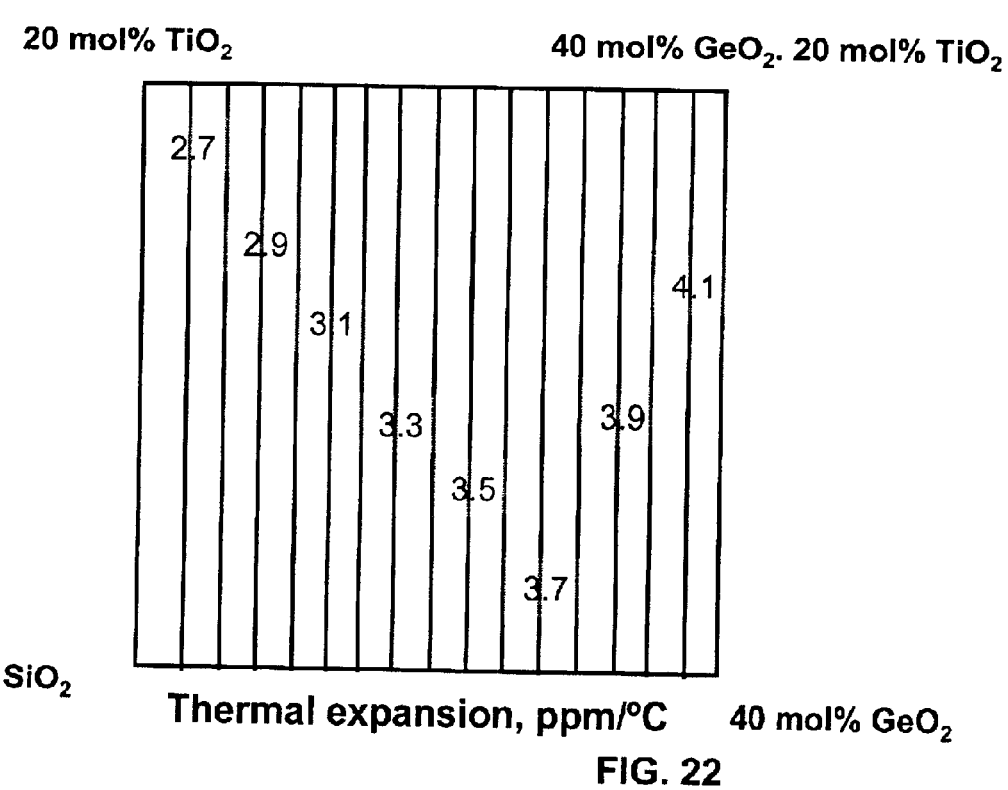
FIG. 22 is a graph of estimated coefficients of thermal expansion for a silica-germania-titania system.
Figure 23:
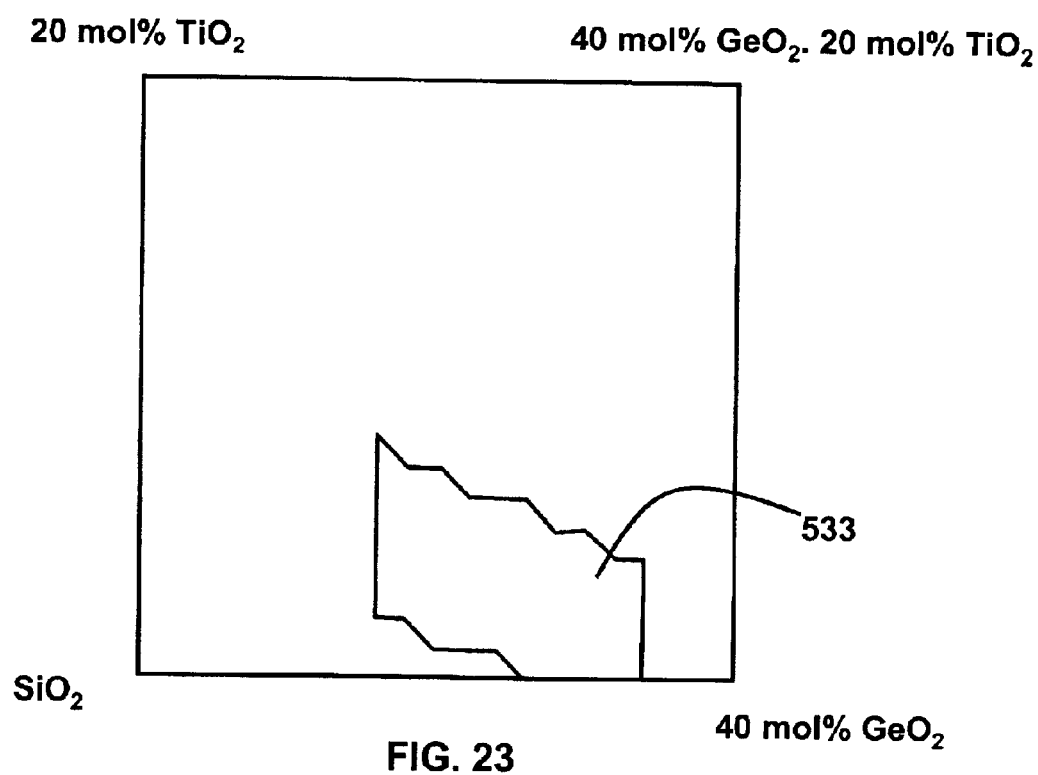
FIG. 23 is a graph showing the compositional range for a silica-germania-titania material having an index of refraction of from about 1.48 to about 1.52 at 1550 nm and a coefficient of thermal expansion of from about $3 \times 10^{-6}$ $°C.^{-1}$ to about $4.4 \times 10^{-6}$ $°C.^{-1}$.

The estimated refractive index and thermal expansion of silica-germania-titania glasses are shown in FIGS. 21 and 22 respectively. The region of interest can be defined by a refractive index at 1550 nm of from about 1.48 to about 1.52 and a coefficient of thermal expansion of from about 3×10$^{-6\circ}$ C.$^{-1}$ to about 4.4×10$^{-6\circ}$ C.$^{-1}$. The silica-germania-titania glass compositions of interest are approximately 8–17 mole percent germania (GeO$_2$) and 0–8 mole percent titania (TiO$_2$) Compositions of interest are shown as region 533 in FIG. 23.

Silica-germania-titania glass films can be deposited, for example, by plasma enhanced chemical vapor deposition (PECVD). These films can be deposited from a variety of precursors. Possible silicon precursors include, but are not limited to, silane, disilane, dichlorosiliane, silicon tetrachloride, tetraethoxysilane, tetramethoxysilane, diacetoxydisecbutoxysilane, diethyoxysilane, tetrakisethylaminosilane, tetrakisdimethylaminosilane, octamethylcyclotetrasilane, tetramethylcyclotetrasilane and bis-t-butylaminosilane. Possible germanium precursors include, but are not limited to, germane, digermane, germanium tetrachloride, tetramethoxygermane, tetraethoxygermane, tetramethylgermane, tetraethylgermane, diethyldichlorogermane, and octamethylcyclotetragermoxane. Possible titanium precursors include, but are not limited to titanium tetrachloride, titanium isopropoxide, tetrakisdiethylaminotitanium and tetrakis(trimethylsiloxy)titanium. Possible oxidizers include, but are not limited to, nitrous oxide, nitric oxide, oxygen and ozone.

$SiO_2$—$GeO_2$—$TiO_2$ EXAMPLES

Silica-germania-titania films were deposited by PECVD using a STS Multiflex PECVD system. This is a parallel plate reactor where the precursor gases enter through an array of holes in the top electrode (showerhead), and the sample rests on the bottom electrode, a non-rotating heated platen. The system was pumped with a roots blower, and either a low frequency (375 kHz) or high frequency (13.56 MHz) RF generator and matching network were used to form a plasma. Available process gasses were silane ($SiH_4$), germane ($GeH_4$), deuterated ammonia ($ND_3$), nitrogen ($N_2$), tetraethoxysilane (TEOS), tetramethoxygermane (TMOG), trimethylborate (TMB) trimethylphosphite (TMPi), and oxygen. Titania sources such as titanium isopropoxide (TIP) and tetrakis(trimethylsiloxyl)titanium (TTMST) were introduced with a flash-evaporator liquid delivery system. Other process gasses may be used, such as, for example, deuterated germane and deuterated silane, as would be apparent to the skilled artisan.

Two series of wafers were deposited using the PECVD system described above in connection with the GeSiON examples over the composition range of interest using TEOS, TMOG, $O_2$, and either TIP or TTMST. Samples were deposited on 100 mm Si wafers, and 3 inch quartz wafers. Wafer curvature was determined prior to and after deposition, and a film stress was calculated. The refractive index, optical propagation loss, and film thickness were determined with a prism coupling system (Metricon). The concentration of [OH], [SiO], [GeO] and [TiO] species were examined by infrared spectroscopy, and composition were determined by electron microprobe. Film thermal expansion coefficients were determined by measuring bending of coated silicon and quartz wafers as a function of temperature. Recipes for core and clad compositions with $\Delta n=0.75\%$ and 0.34% were determined by fitting experimental data, depositing films, and re-iterating the model.

The resulting silica-germania-titania films are useful for fabricating low index planar light wave circuits appropriate for a liquid crystal cross-connect switching device based on total internal reflectance of prismatic shaped liquid crystal-filled trenches. The composition achieves the desired refractive index (from about 1.48 to about 1.52) with low wafer warpage. Because of the greater surface mobility of metal-lorganic precursors, problems associated with the root crack should be avoided. In addition, this all oxide composition is stable and reflowing is possible.

LC CROSS-CONNECT DEVICE

Figure 4:
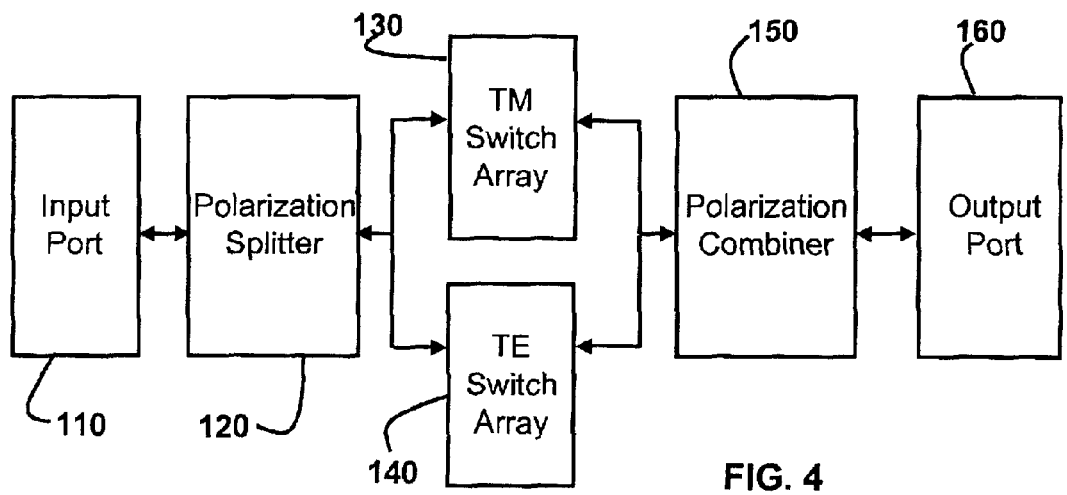
FIG. 4 is a block diagram of an exemplary cross-connect system.

FIG. 4 shows an exemplary cross-connect system which may incorporate the GeSiON and $GeO_2$—$SiO_2$—$TiO_2$ materials of this invention. This system is described fully in commonly owned and copending U.S. patent application Ser. No. 09/604,039, which is incorporated herein by reference. The system comprises an input port 110 coupled to a polarization splitter 120. The splitter 120 is coupled to a TM switch array 130 and a TE switch array 140. Switch arrays 130, 140 are coupled to a polarization combiner 150, in turn coupled to an output port 160. The input port 110 is a linear array of planar waveguides to which an array of fibers can be pigtailed. The spacing between waveguides is determined by pigtailing capabilities. Light from the fibers enters the input port 110 and is transmitted to the polarization splitter 120.

The polarization splitter separates light into its TM and TE components. The TM components are then passed to the TM switch array 130, and the TE components are passed to the TE switch array 140. As described in further detail below, the outputs of the switch arrays 130 and 140 are combined by the polarization combiner 150 and passed to the output port 160. Similar to the input port 110, the output port 160 is a linear array of planar waveguides to which an array of fibers can be pigtailed. TM and TE are defined herein by convention at the LC trench interfaces, and not by waveguide convention.

Figure 5:
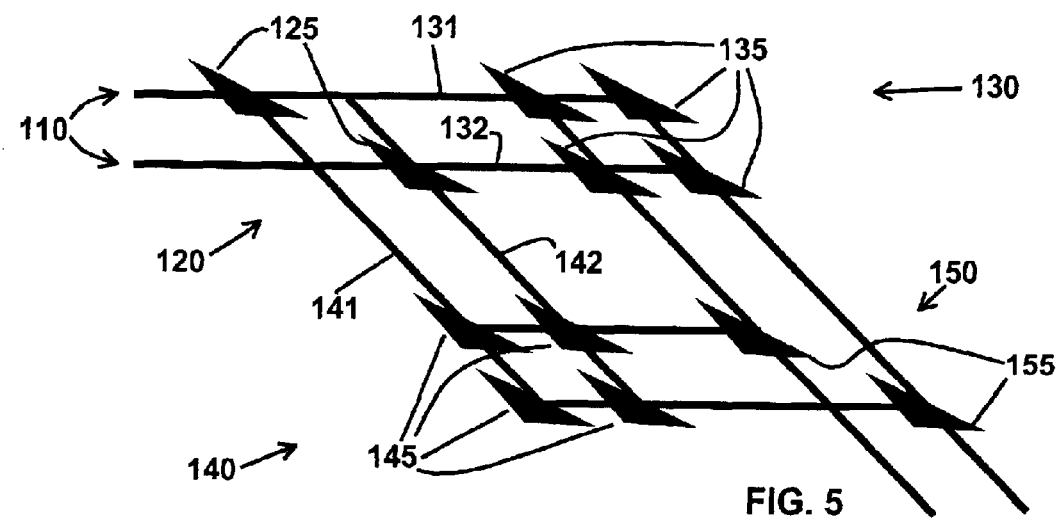
FIG. 5 is a detailed schematic diagram of a 2x2 cross-connect system of FIG. 4.

FIG. 5 is a detailed view of the cross-connect system of FIG. 4 with the exemplary cross-connect being a 2×2 cross-connect. The LC prism elements are prismatic liquid crystal-filled trenches. Light from the input port 110 that enters the polarization splitter 120 which includes a pair of LC prisms 125 that reflect the TE waves to the TE switch array 140 while passing the TM waves to the TM switch array 130 as shown, for example, in FIG. 8 and described below. The switching arrays 130, 140 are preferably between about 50 and 500 μm center to center, and more preferably about 250 μm center to center. Each switch array 130, 140 has a plurality of LC (liquid crystal) prism switching elements 135, 145 in each path 131–132 and 141–142, respectively, as shown, for example, in FIGS. 10A, 10B, 11A, and 11B, as described below. A single switching element in each path is set to a reflecting state to pass the light onto the polarization combiner 150. It should be noted that the path length for the TE and TM waves are substantially identical. The polarization combiner 150 includes a pair of LC prisms 155 that each allow the TE wave to pass while reflecting the TM wave to recombine, as shown, for example, in FIG. 9, described below. Thus, the beams are recombined and passed to the appropriate path in the output port 160.

Figure 6:
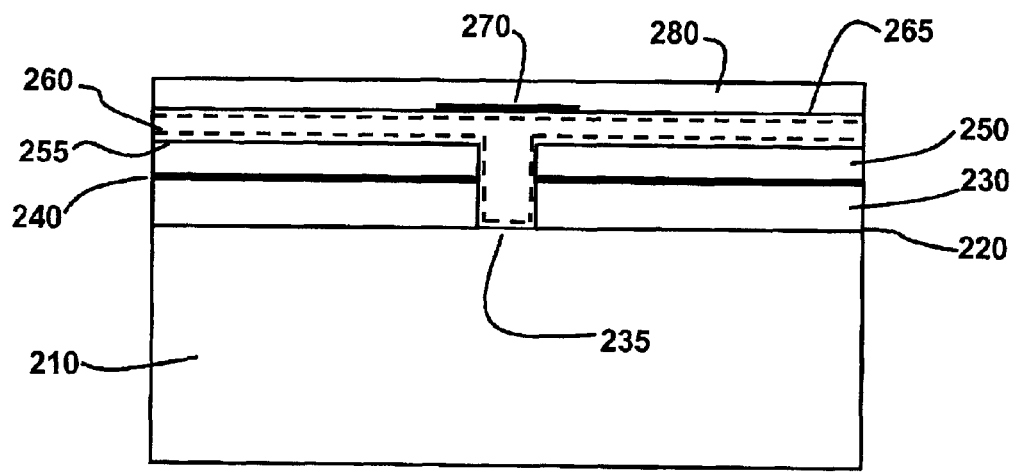
FIG. 6 shows a cross-sectional side view of an exemplary LC prism in a planar waveguide.

The polarization splitter 120, the switching arrays 130, 140, and polarization combiner 150 are preferably formed with the same fundamental element, which is preferably an LC prism 235 that is formed as a prism-shaped LC-filled trench in a planar waveguide, as shown in FIG. 6. The structure functions as the desired element depending on an applied voltage, as described below.

The support plate or substrate 210 on which the waveguide is patterned preferably has five deposited layers thereon. The first layer is a first electrode 220, such as a grounding electrode that comprises an unpatterned conductive coating such as gold, aluminum, or indium tin oxide. The grounding electrode can be either a single electrode or a segmented electrode. A cladding layer 230 is deposited on the first electrode 220, and comprises a cladding layer having a thickness between about 12 and 50 μm thick for the planar waveguide. A core layer 240 is deposited on the cladding layer to a thickness between about 4 and 10 μm. A cladding layer 250, similar to the cladding layer 230, is formed above the core layer 240 to a thickness between about 12 and 50 μm. The layers 230, 240 and 250 are etched through a photolithographically defined mask or otherwise patterned to form prism-shaped trenches 236 that provide the grid structure of FIG. 5. As discussed further below, the trench is shaped to define a prism, and is preferably shaped as a triangle.

In accordance with the principles of this invention, core layer 240 and cladding layers 230 and 250 are fabricated, such as with plasma enhanced, chemical vapor deposition, from a GeSiON glass composition having a Ge/(Si+Ge) ratio of from about 0.25 to about 0.4 and an N/(N+O) ratio of 0 to about 0.1, whereby the refractive index of the material is from about 1.48 to about 1.52 at 1550 nm, and the coefficient of thermal expansion at room temperature is from about $3 \times 10^{-6\circ}$ $C.^{-1}$ to about $4.4 \times 10^{-6\circ}$ $C.^{-1}$. It will be understood by those having ordinary skill in the art that the refractive index of the material comprising core layer 240 will be slightly higher (e.g., typically less than 1% higher) than the refractive index of the cladding layers 230, 250. As can be seen by reference to FIG. 1, this can be most easily achieved by using a slightly higher nitrogen or titania content in the core layer than in the cladding layers.

A first alignment layer 255 is disposed above the cladding layer 250 and on the walls of the trench 236 formed by the etching or patterning of layers 230, 240, and 250. The alignment layer 255 comprises a thin copolymer layer or other material, such as an obliquely evaporated SiO, silane coupling agents, or a polymer to assist in homeotropic alignment of LC material in the LC layer 260. The alignment layer 255 is preferably deposited to a thickness of between one monolayer and about 100 monolayers (e.g., from about 5 nm to about 500 nm). The alignment layer 255 should be thin enough to avoid creating an optical effect due to its refractive index. The liquid crystal layer 260 is then deposited over the first alignment layer 255 both in the trench 236 and over the cladding layer 250. The thickness of the liquid crystal material above the first alignment layer 255 is preferably less than about 25 $\mu$m. Any liquid crystal material can be used, including those from the nematic class (preferred) and the ferroelectric class. One liquid crystal material that can be used is BL009 (EM Industries, Inc.), having a birefringence of about 0.28. It should be noted that the larger the birefringence for the LC material, the more preferable the material is for use with the system of the present invention. The geometry of the prism trenches depends on the LC birefringence, with larger birefringences giving a smaller trench and more efficient switching.

A second alignment layer 265 is disposed on the LC layer 260. The second alignment layer 265 is preferably substantially similar in composition and thickness to the alignment layer 255, although this does not have to be the case.

A top plate preferably has two layers. The first top plate layer is a second electrode, such as an address electrode layer 270 that comprises a patterned conductive coating such as gold, aluminum, or indium tin oxide. The second top plate layer, which covers the first top plate layer, is a cover glass layer 280. The thickness of the layers 270 and 280 is not critical, as would be known by those skilled in the art, and each can have a thickness between about 0.3 and 300 $\mu$m or even greater. It should be noted that the first and second electrodes can act as the grounding and address electrodes, respectively, or the first and second electrodes can act as the address and grounding electrodes, respectively.

FIGS. 7A and 7B illustrate the orientation of the LC molecules of LC layer 260 in trench 236 without and with a voltage applied to the second electrode 270, respectively. With substantially no voltage applied, as shown in FIG. 7A, the LC molecules tend to align substantially perpendicular to any interface coated with a properly chosen first alignment layer. Therefore, the director axis inside the trench 235 lies in the plane of the waveguide fabric and perpendicular to the trench interface. When a sufficient voltage is applied to the address electrode, as shown in FIG. 7B, the LC molecules rotate to align with the electric field. In this case, the director axis lies substantially perpendicular to the substrate. A typical voltage that is sufficient to turn on the address electrode is between about 3 and 5 volts. The threshold voltage depends on the LC material being used and the distance between the electrodes. It should be noted that the higher the applied voltage above the threshold voltage, the faster the switch action.

Because the birefringence of an LC material is typically on the order of about 0.1 to 0.3, the optical properties for the TE and TM guided modes are substantially different and can be significantly changed with an applied field. As described below, the LC prisms can be used for polarization splitting, TE and TM switching, polarization combining, signal splitting, and variable optical attenuating.

An LC prism 235 utilized as a polarization splitting element 125 is shown in FIG. 8. The LC prism used as splitter 125 is shown with an electric field applied across the volume of the LC material so as to align the LC molecules perpendicular to the triangular facets in a similar orientation as illustrated in FIG. 7B. Since TE light is polarized parallel to the LC director, it experiences the extraordinary refractive index, $n_e=1.7$, and is totally internally reflected at the back surface (i.e., the long side) of the LC prism triangle. TM light sees only the ordinary refractive index, $n_o=1.5$, and passes through LC prism 235 without refracting or reflecting.

FIG. 9 shows an LC prism used as a polarization combiner 155. The LC prism is shown with an electric field applied across the volume of the LC material to align the LC molecules perpendicular to the triangular facets in a similar orientation as illustrated in FIGS. 7B and 8. As shown, the TM light passes through combiner 155 without refracting or reflecting while TE light is reflected at the back surface of the LC prism triangle. Both the TE and TM light thus exit the same side of the triangular prism.

FIGS. 10A and 10B show an LC prism used as a TE switch 145. In FIG. 10A, the LC prism is shown with no electric field applied across the volume of the LC prism. When no electric field is applied, the LC molecules are homeotropically aligned parallel to the triangular facets in a similar orientation as illustrated in FIG. 7A. The TE polarized light sees only the ordinary refractive index $n_o$ in this case, and passes through the LC prism. When switching is desired, a voltage is applied across the first and second electrodes and hence across the volume of the prism thereby rotating and aligning the LC molecules vertically in the same orientation as in FIGS. 7B, 8, and 9. Similar to the polarization splitter, the TE light reflects off the hypotenuse surface of the LC prism triangle causing the TE light to exit the LC prism through a different face than is shown in FIG. 11A.

FIGS. 1A and 1B illustrate an LC prism used as a TM switch 135. FIG. 1A shows the TM switch 135 with an electric field applied across the volume of the LC prism in which case the LC molecules are aligned vertically in the same manner as shown in FIGS. 7B, 8, 9, and 10B. When in this state, TM light passes through switch 135 without refraction or reflection. FIG. 11B shows the TM switch 135 when no electric field is applied to the LC prism. In this state, the LC molecules are aligned perpendicular to the triangle surfaces and are thus aligned in the same manner as in FIGS. 7A and 10A. When in this state, TM light is reflected from the hypotenuse of the triangle and exit a different face of the triangle as shown in FIG. 11B.

As will be apparent to those skilled in the art, the polarization splitting elements 125 and polarization combining elements 155 are bidirectional. Similarly, TM and TE switches 135 and 145, respectively, are also bi-directional. Thus, light signals may be input through output ports 160 and exit from input ports 110.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

The invention claimed is:

1. A glass composition comprising:

a germanium-silicon oxynitride having a Ge/(Si+Ge) mole ratio of from about 0.25 to about 0.47 and an N/(N+O) mole ratio of less than about 0.1.

2. The glass composition of claim 1, wherein the Ge/(Si+Ge) mole ratio is about 0.35 and the N/(N+O) mole ratio is about 0.05.

3. The glass composition of claim 2 exhibiting a refractive index of from about 1.48 to about 1.52 at 1550 nm, and having a coefficient of thermal expansion at room temperature of from about $3 \times 10^{-6}$ °C.$^{-1}$ to about $4.4 \times 10^{-6}$ °C.$^{-1}$.

4. The glass composition of claim 1 exhibiting a refractive index of from about 1.48 to about 1.52 at 1550 nm, and having a coefficient of thermal expansion at room temperature of from about $3 \times 10^{-6}$ °C.$^{-1}$ to about $4.4 \times 10^{-6}$ °C.$^{-1}$.

5. A planar optical device comprising:

a waveguide core and waveguide cladding, wherein at least one of the waveguide core and the waveguide cladding is a germanium-silicon oxynitride glass having a Ge/(Si+Ge) mole ratio of from about 0.25 to about 0.47 and an N/(N+O) mole ratio of less than about 0.1.

6. The planar optical device of claim 5, wherein the Ge/(Si+Ge) mole ratio is about 0.35 and (N/(N+O) mole ratio is about 0.05.

7. The planar optical device of claim 6, wherein the planar optical device is an optical switch having liquid crystal switches located at intersecting waveguides.

8. The planar optical device of claim 7, wherein the planar optical device is a cross-connect optical switching device.

9. A method of forming a planar optical device on a silicon substrate, wherein the device includes a waveguide baying a refractive index of from about 1.48 to about 1.52 at 1550 nm, and a coefficient of thermal expansion of from about $3 \times 10^{-6}$ °C.$^{-1}$ to about $4.4 \times 10^{-6}$ °C.$^{-1}$, comprising:

depositing on a silicon substrate by plasma enhanced chemical vapor deposition a germanium-silicon oxide or oxynitride cladding layer having a Ge/(Si+Ge) mole ratio of from about 0.25 to about 0.47 and an N/(N+O) mole ratio of 0 to about 0.1;

depositing on the cladding layer by plasma enhanced chemical vapor deposition a germanium-silicon oxide or oxynitride core layer having a Ge/(Si+Ge) mole ratio of from about 0.25 to about 0.47 and an N/(N+O) mole ratio of 0 to about 0.1, wherein the refractive index of the core layer is higher than the refractive index of the cladding layer.

10. The method of claim 9 further comprising annealing the cladding layer and the core layer to a temperature greater than 1,000° C. in an oxidizing atmosphere, and cooling the cladding layer and the core layer at a rate greater than 200° C./hr to a temperature below the strain point of the glass.

11. The method of claim 9 wherein the core layer and the cladding layer are deposited by exposing a substrate to a reaction gas mixture including a silicon precursor, a germanium precursor, a nitrogen source, and optionally including a carrier gas, wherein the plasma is formed by two electrodes driven by separate RF power supplies and a region of the chamber that is grounded, and wherein the substrate is placed on one of the electrodes that is driven with a RF power supply having a frequency less than 1 MHz, and the other electrode is driven with a RF power supply having a frequency greater than 1 MHz.

12. A planar optical device comprising:

a waveguide core and waveguide cladding, wherein at least one of the waveguide core and the waveguide cladding is a silica-germania-titania glass having a Ge/(Si+Ge+Ti) mole ratio of from about 0.08 to about 0.17 and a Ti/(Si+Ge+Ti) mole ratio of less than about 0.08.

13. The planar optical device of claim 12, wherein the planar optical device is an optical switch having liquid crystal switches located at intersecting waveguides.

14. The planar optical device of claim 13, wherein the planar optical device is a cross-connect optical switching device.

15. A method of forming a planar optical device on a silicon substrate, comprising:

depositing on a silicon substrate by plasma enhanced chemical vapor deposition a silica-germania-titania cladding layer having a Ge/(Si+Ge+Ti) mole ratio of from about 0.08 to about 0.17 and a Ti/(Si+Ge+Ti) mole ratio of 0 to about 0.08; and depositing on the cladding layer by plasma enhanced chemical vapor deposition a silica-germania-titania core layer having Ge/(Si+Ge+Ti) mole ratio of from about 0.08 to about 0.17 and a Ti/(Si+Ge+Ti) mole ratio of from 0 to about 0.08, wherein the refractive index of the come layer is higher than the refractive index of the cladding layer, wherein the device includes a waveguide having a refractive index of from about $3 \times 10^{-6}$ °C.$^{-1}$ to about $4.4 \times 10^{-6}$ °C.$^{-1}$.

16. The glass composition of claim 1, wherein the glass composition consists essentially of oxides and nitrides of silica and germania.

17. The planar optical device of claim 5, wherein the germanium-silicon-nitride glass consists essentially of oxides and nitrides of silica and germania.

18. The planar optical device of claim 12, wherein the silica-germania-titania glass consists essentially of oxides of silicon, germanium and titanium.

19. The planar optical device of claim 12 wherein the silica-germania-titania glass has a refractive index of from about 1.48 to about 1.52 at 1550 nm and a coefficient of thermal expansion at room temperature of from about $3 \times 10^{-6}$ °C.$^{-1}$ to about $4.4 \times 10^{-6}$ °C.$^{-1}$.

* * * * *

UNITED STATES PATENT AND TRADEMARK OFFICE
CERTIFICATE OF CORRECTION

PATENT NO. : 6,768,856 B2
DATED : July 27, 2004
INVENTOR(S) : Simpson, Lynn B. et al.

It is certified that error appears in the above-identified patent and that said Letters Patent is hereby corrected as shown below:

Column 13,
Line 38, "baying" should be -- having a refractive index --

Column 14,
Line 38, "come" should be -- core layer --
Line 41, insert after "of from about" and before "$3 \times 10^{-60}$" -- 1.48 to about 1.52 at 1550nm and a coeffieient of thermal expansion of from about --

Signed and Sealed this

First Day of February, 2005

JON W. DUDAS
*Director of the United States Patent and Trademark Office*